US010902508B2

(12) United States Patent  
Scoda et al.

(10) Patent No.: US 10,902,508 B2  
(45) Date of Patent: Jan. 26, 2021

(54) METHODS FOR EXTRACTING AND ADAPTING INFORMATION TO GENERATE CUSTOM WIDGETS AND DEVICES THEREOF

(71) Applicant: Usablenet Inc., New York, NY (US)

(72) Inventors: Enrico Scoda, Martignacco (IT); Giovanni Piller Cottrer, Sappada (IT)

(73) Assignee: USABLENET INC., New York, NY (US)

( * ) Notice: Subject to any disclaimer, the term of this patent is extended or adjusted under 35 U.S.C. 154(b) by 287 days.

(21) Appl. No.: 15/610,977

(22) Filed: Jun. 1, 2017

(65) Prior Publication Data

US 2018/0349004 A1 Dec. 6, 2018

(51) Int. Cl.
*G06Q 30/06* (2012.01)

(52) U.S. Cl.
CPC .................. *G06Q 30/0643* (2013.01)

(58) Field of Classification Search
CPC .............. G06F 3/04847; G06F 3/0482; G06F 17/2247; G06Q 30/0643
See application file for complete search history.

(56) References Cited

U.S. PATENT DOCUMENTS

| | | | | |
|---|---|---|---|---|
| 2003/0167209 A1* | 9/2003 | Hsieh | ............ | G06Q 10/087 705/35 |
| 2012/0010995 A1* | 1/2012 | Skirpa | ............ | G06F 3/0481 705/14.49 |
| 2012/0137227 A1* | 5/2012 | Gerken, III | ............ | G06F 8/38 715/747 |
| 2013/0191723 A1* | 7/2013 | Pappas | ............ | G06F 17/2247 715/234 |
| 2014/0359490 A1* | 12/2014 | Ma | ............ | G06F 16/9535 715/760 |
| 2016/0124934 A1* | 5/2016 | Greenberg | ............ | G06Q 30/0641 715/202 |

OTHER PUBLICATIONS

NPL—search—1561097 (Year: 2020).*

* cited by examiner

*Primary Examiner* — Angie Badawi  
(74) *Attorney, Agent, or Firm* — Troutman Pepper Hamilton Sanders LLP (Rochester)

(57) ABSTRACT

Methods, non-transitory computer readable media, and content customization apparatuses that provides a front-end interface in response to a received request to generate a custom widget and receives an address for a web page submitted via the front-end interface. The request includes an address for a web page. The web page is obtained based on the address and web page source code for the web page is analyzed to extract a plurality of wrappers. Each of the wrappers includes information for one of a plurality of identified items. The wrappers are then provided to the front-end interface in response to the request. The front-end interface is configured to generate and output a style editor panel and a preview panel configured to display a widget comprising the wrappers and automatically update the widget, in response to modification of presentation source code via the style editor panel, to generate the custom widget. The custom widget is received from the front-end interface and stored.

18 Claims, 12 Drawing Sheets

```
1  <div class="ucd-container">
2    <div class="ucd-item">
3      <div class="uc-qv-image-holder">
4        <a class="uc-product-link" href="http://www.johnlewis.com/
5        <img src="http://www.johnlewis.com/is/image/JohnLew
6    /* element containing all items */
7    .ucd-container {
```

```
/**
 * Write your custom CSS here!
 */
```

John Lewis Wilton Child Compliant Bedstead, Single, White
£145.00
★★★★★ 9 reviews Jay-Be Oxford Folding Bed with Pocket Sprung Mattress, Small Single
£199.00
★★★★★ 4 reviews John Lewis Wilton Bedstead Double, White
£175.00
★★★★★ 171 reviews John Lewis Boris Toddler Bedstead, White
£60.00
★★★★★ 73 reviews Back     Save & Use Custom CSS

METHODS FOR EXTRACTING AND ADAPTING INFORMATION TO GENERATE CUSTOM WIDGETS AND DEVICES THEREOF

FIELD

This technology generally relates to web page design and publishing and, more particularly, to methods and devices for extracting and adapting information to generate custom widgets.

BACKGROUND

Increasingly, content providers have a need to publish new web pages that partially replicate the content of main or source web pages, but have a different presentation or style than the main or source web pages. For example, a retailer may want to incorporate information for a subset of products in a catalog or product listing page (PLP) via a widget into a new web page, or publish such a widget as a new web page. In many cases, the publisher of the new web page will want to modify the presentation of the information in the widget, and/or the quantity of information associated with each product in the widget, for more appropriate or effective use in a different context.

The style can be defined by source code including cascading style sheets (CSS) within a hypertext markup language (HTML) web page, for example. In order to generate and publish the new web page, a developer currently must essentially start from scratch by generating the source code for the new web page, requiring significant resources and knowledge of web design language(s). In other words, there is currently no easy way to extract, adapt, and repurpose content hosted on another web page in another format and context.

Accordingly, generating and publishing new web pages based on previously-published content requires a significant amount of effort and time, as well as technical knowledge, by information technology (IT) or software development professionals. The challenges associated with quickly generating and publishing widgets, and new web pages incorporating widgets, can lead to an underutilization of web sites and reduced meaningful engagement with users.

SUMMARY

A method for extracting and adapting information to generate custom widgets implemented by one or more content customization apparatuses includes providing a front-end interface in response to a received request to generate a custom widget and receiving an address for a web page submitted via the front-end interface. The web page is obtained based on the address and web page source code for the web page is analyzed to extract a plurality of wrappers. Each of the wrappers includes information for one of a plurality of identified items. The wrappers are then provided to the front-end interface in response to the request. The front-end interface is configured to generate and output a style editor panel and a preview panel configured to display a widget comprising the wrappers and automatically update the widget, in response to modification of presentation source code via the style editor panel, to generate the custom widget. The custom widget is received from the front-end interface and stored.

A content customization apparatus, comprising memory comprising programmed instructions stored thereon and one or more processors configured to be capable of executing the stored programmed instructions to provide a front-end interface in response to a received request to generate a custom widget and receive an address for a web page submitted via the front-end interface. The web page is obtained based on the address and web page source code for the web page is analyzed to extract a plurality of wrappers. Each of the wrappers includes information for one of a plurality of identified items. The wrappers are then provided to the front-end interface in response to the request. The front-end interface is configured to generate and output a style editor panel and a preview panel configured to display a widget comprising the wrappers and automatically update the widget, in response to modification of presentation source code via the style editor panel, to generate the custom widget. The custom widget is received from the front-end interface and stored.

A non-transitory computer readable medium having stored thereon instructions for extracting and adapting information to generate custom widgets comprising executable code which when executed by one or more processors, causes the one or more processors to provide a front-end interface in response to a received request to generate a custom widget and receive an address for a web page submitted via the front-end interface. The web page is obtained based on the address and web page source code for the web page is analyzed to extract a plurality of wrappers. Each of the wrappers includes information for one of a plurality of identified items. The wrappers are then provided to the front-end interface in response to the request. The front-end interface is configured to generate and output a style editor panel and a preview panel configured to display a widget comprising the wrappers and automatically update the widget, in response to modification of presentation source code via the style editor panel, to generate the custom widget. The custom widget is received from the front-end interface and stored.

This technology provides a number of advantages including providing methods, non-transitory computer readable media, and content customization apparatuses that facilitate more effective and efficient generation and publication of widgets, which incorporate previously-published content in a different format. With this technology, information hosted by a main or source web page can be automatically extracted and adapted in the form of a widget that can be customized with respect to the included information and the presentation or style of that information. Accordingly, web developers can more efficiently generate widgets that can be published, or incorporated into other web pages, in order to engage users in different contexts.

BRIEF DESCRIPTION OF THE DRAWINGS

FIG. 7 is an exemplary group listing page of a front-end interface;

FIG. 10 is an exemplary customization page of a front-end interface with a source code panel, style editor panel, and a preview panel;

DETAILED DESCRIPTION

Figure 1:
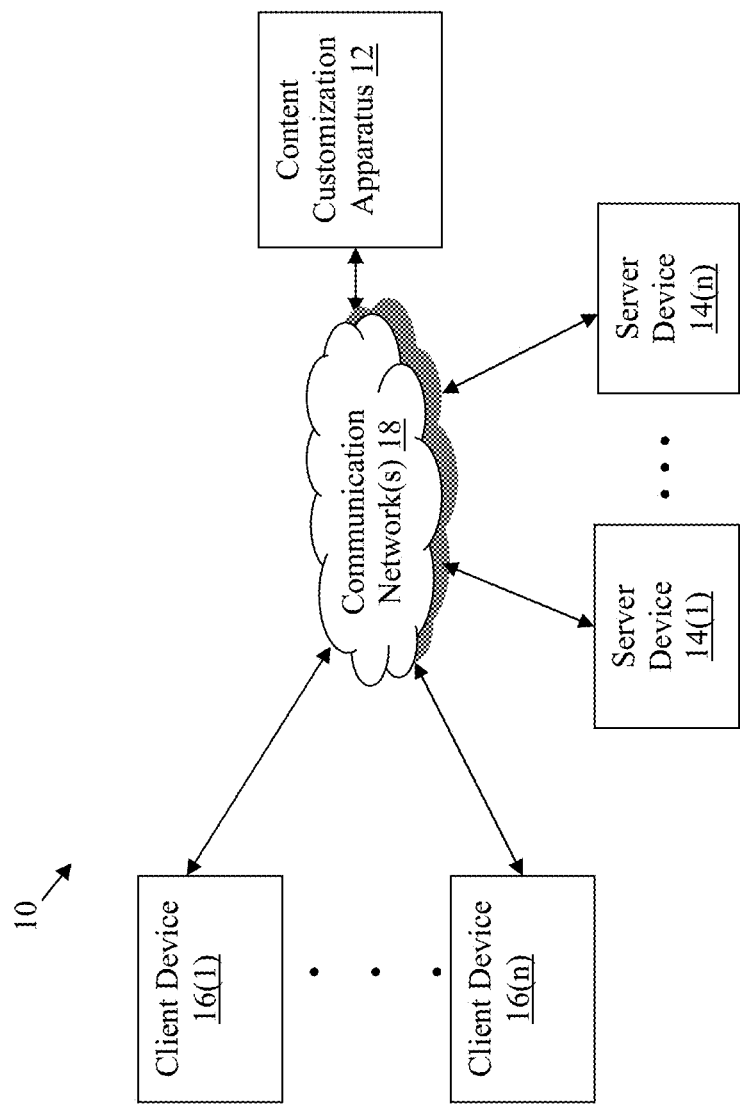
FIG. 1 is a block diagram of a network environment with an exemplary content customization apparatus.

Referring to FIG. 1, an exemplary network environment 10 with an exemplary content customization apparatus 12 is illustrated. The content customization apparatus 12 in this example is coupled to a plurality of server devices 14(1)-14(n) and a plurality of client devices 16(1)-16(n) via communication network(s) 18, although the content customization apparatus 12, server devices 14(1)-14(n), and/or client devices 16(1)-16(n), may be coupled together via other topologies. Additionally, the network environment 10 may include other network devices such as one or more routers and/or switches, for example, which are well known in the art and thus will not be described herein. This technology provides a number of advantages including methods, non-transitory computer readable media, and content customization apparatuses that facilitate more efficient generation of custom widgets.

Figure 2:
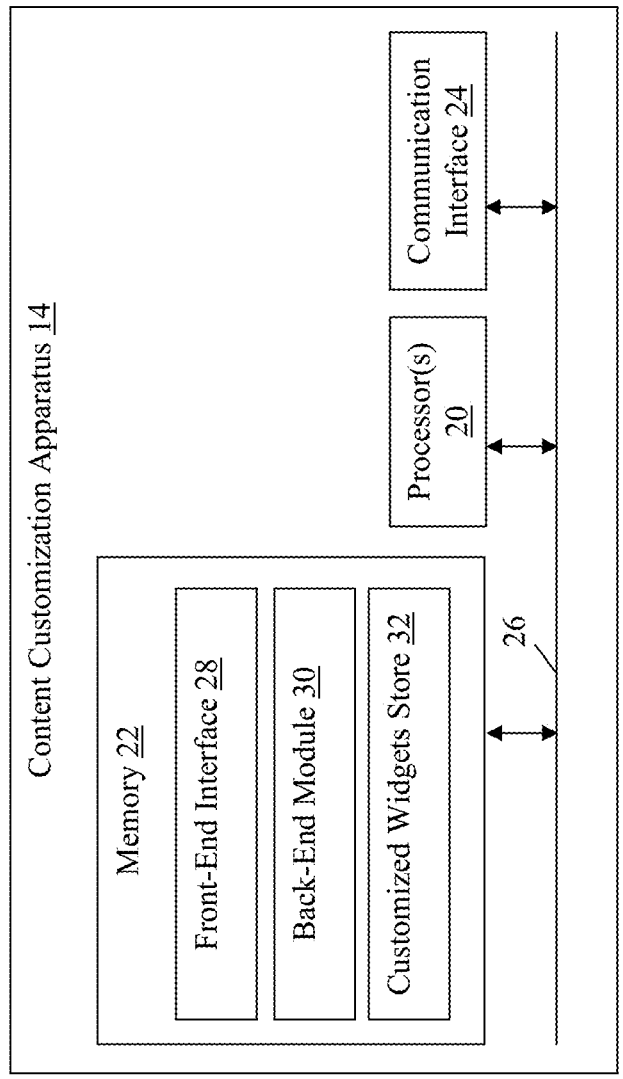
FIG. 2 is a block diagram of an exemplary content customization apparatus.

Referring to FIGS. 1-2, the content customization apparatus 12 in this example includes one or more processors 20, a memory 22, and/or a communication interface 24, which are coupled together by a bus 26 or other communication link, although the content customization apparatus 12 can include other types and/or numbers of elements in other configurations. The processor(s) 20 of the content customization apparatus 12 may execute programmed instructions stored in the memory 22 for the any number of the functions described and illustrated herein. The processor(s) 20 of the content customization apparatus 12 may include one or more CPUs or general purpose processors with one or more processing cores, for example, although other types of processor(s) can also be used.

The memory 22 of the content customization apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 20, can be used for the memory 22.

Accordingly, the memory 22 of the content customization apparatus 12 can store one or more applications that can include computer executable instructions that, when executed by the content customization apparatus 12, cause the content customization apparatus 12 to perform actions, such as to transmit, receive, or otherwise process network messages, for example, and to perform other actions described and illustrated below with reference to FIGS. 3-12. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the content customization apparatus 12 itself, may be located in virtual server(s) running in a cloud-based computing environment rather than being tied to one or more specific physical network computing devices. Also, the application(s) may be running in one or more virtual machines (VMs) executing on the content customization apparatus 12. Additionally, in one or more embodiments of this technology, virtual machine(s) running on the content customization apparatus 12 may be managed or supervised by a hypervisor.

In this particular example, the memory 22 of the content customization apparatus 12 includes a front-end interface 28, back-end module 30, and custom widget store 32, although the memory 22 can include other policies, modules, databases, or applications, for example. The front-end interface 28 in this example is configured to facilitate generation of a custom widget via interactions with a user, and can be executable in a web browser on one of the client devices 16(1)-16(n).

The front-end interface 28 receives an address for a source web page from which a custom widget is to be generated, sends the address to the back-end module 30, and receives one or more wrappers, groups, and/or hooks in response. The front-end interface 28 then facilitates selections of groups of items and generates a style editor panel and a preview panel based on the wrappers, groups, and hooks in order to facilitate efficient generation of a custom widget that includes the items presented via a different style than the source web page. The operation of the front-end interface 28 is described and illustrated in more detail later with reference to FIG. 6.

The back-end module 30 in this example receives an address for the source web page from the front-end interface 28 and analyzes the source code of the web page to extract information for items defined therein, including one or more wrappers, groups, and/or hooks. The back-end module 30 can also store the custom widget received from the front-end interface 28 in the custom widgets store 32 and/or facilitate publication of the custom widget. The back-end module 30 can be implemented as, or can include, a web service (e.g., an agile web service), although other types of implementations for the back-end module 30 can also be used. The operation of the back-end interface 30 is described and illustrated in more detail later with reference to FIG. 3.

The communication interface 24 of the content customization apparatus 12 operatively couples and communicates between the content customization apparatus 12, the server devices 14(1)-14(n), and/or the client devices 16(1)-16(n), which are all coupled together by the communication network(s) 18, although other types and/or numbers of communication networks or systems with other types and/or numbers of connections and/or configurations to other devices and/or elements can also be used.

By way of example only, the communication network(s) 18 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 18 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The content customization apparatus 12 can be a standalone device or integrated with one or more other devices or apparatuses, such as one or more of the server devices 14(1)-14(n), for example. In one particular example, the content customization apparatus 12 can include or be hosted by one of the server devices 14(1)-14(n), and other arrangements are also possible. Moreover, one or more of the devices, and/or the back-end module 30, of the content customization apparatus 12 can be in a same or a different communication network including one or more public, private, or cloud networks, for example.

Each of the server devices 14(1)-14(n) in this example includes one or more processors, a memory, and a communication interface, which are coupled together by a bus or other communication link, although other numbers and/or types of network devices could be used. The server devices 14(1)-14(n) in this example process messages received from the client devices 16(1)-16(n) and/or content customization apparatus 12 via the communication network(s) 18 according to the HTTP-based application RFC protocol, for example.

The server devices 14(1)-14(n) may be hardware or software or may represent a system with multiple servers in a pool, which may include internal or external networks. The server devices 14(1)-14(n) may host web sites including a plurality of web pages that can be accessed by the client device 16(1)-16(n) and the content customization apparatus 12. In particular, the server devices 14(1)-14(n) can host source web pages from which content can be extracted by the back-end module 30 of the content customization apparatus 12 for inclusion on a custom widget, as described and illustrated in more detail later.

Although the server devices 14(1)-14(n) are illustrated as single devices, one or more actions of each of the server devices 14(1)-14(n) may be distributed across one or more distinct network computing devices that together comprise one or more of the server devices 14(1)-14(n). Moreover, the server devices 14(1)-14(n) are not limited to a particular configuration. Thus, the server devices 14(1)-14(n) may contain a plurality of network computing devices that operate using a master/slave approach, whereby one of the network computing devices of the server devices 14(1)-14(n) operate to manage and/or otherwise coordinate operations of the other network computing devices.

The server devices 14(1)-14(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The client devices 16(1)-16(n) in this example include any type of computing device that can receive, render, and facilitate user interaction with graphical user interfaces and web content, such as mobile computing devices, desktop computing devices, laptop computing devices, tablet computing devices, virtual machines (including cloud-based computers), or the like. Each of the client devices 16(1)-16(n) in this example includes a processor, a memory, and a communication interface, which are coupled together by a bus or other communication link, although other numbers and/or types of network devices could be used.

The client devices 16(1)-16(n) may run interface applications, such as standard web browsers or standalone client applications, which may provide an interface to communicate with the content customization apparatus 12 via the communication network(s) 18 in order to initiate the generation of a custom widget, including by obtaining the front-end interface 28, as described and illustrated in more detail later. The client devices 16(1)-16(n) may further include a display device, such as a display screen or touchscreen, and/or an input device, such as a keyboard, for example.

Although the exemplary network environment 10 with the content customization apparatus 12, server devices 14(1)-14(n), client devices 16(1)-16(n), and communication network(s) 18 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 10, such as the content customization apparatus 12, client devices 16(1)-16(n), or server devices 14(1)-14(n), for example, may be configured to operate as virtual instances on the same physical machine. In other words, one or more of the content customization apparatus 12, client devices 16(1)-16(n), or server devices 14(1)-14(n) may operate on the same physical device rather than as separate devices communicating through communication network(s) 18. Additionally, there may be more or fewer content customization apparatuses, client devices, or server devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 3:
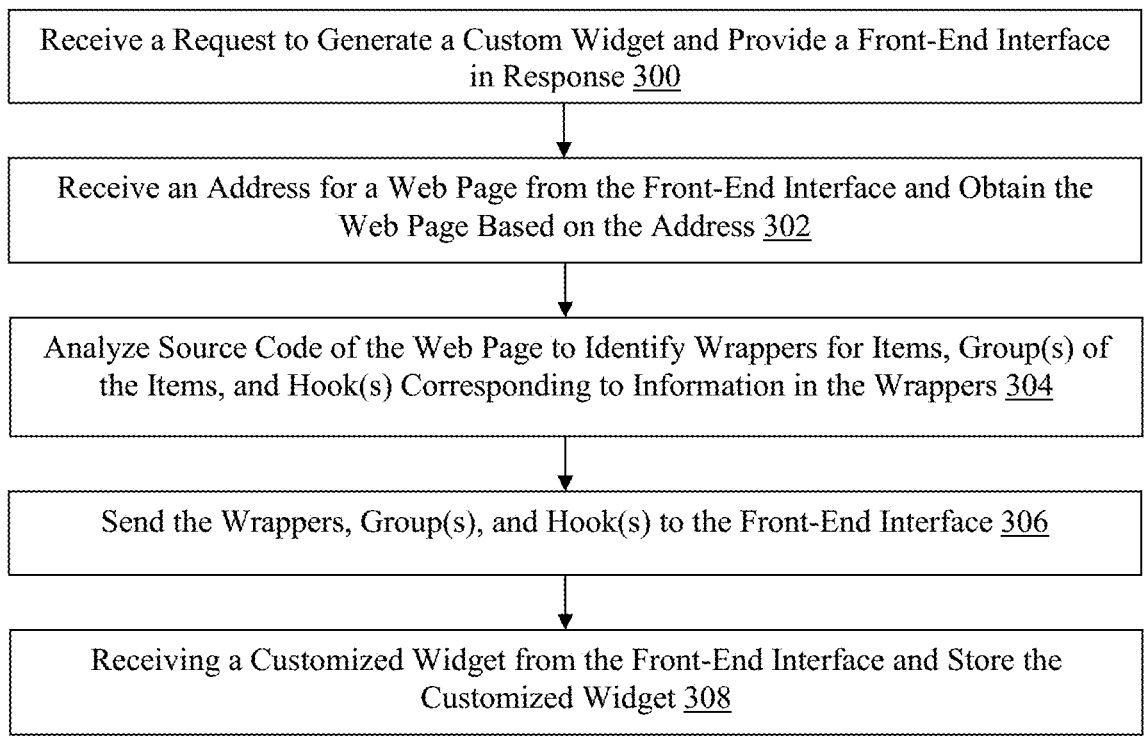
FIG. 3 is a flow chart of an exemplary method for extracting information to facilitate generation of a custom widget.

An exemplary method of extracting and adapting information to generate custom widgets will now be described with reference to FIGS. 1-12. Referring more specifically to FIG. 3, a method of extracting information to facilitate generation of a custom widget is illustrated. In step 300 in this example, the content customization apparatus 12 receives a request to generate a custom widget from one of the client devices 16(1)-16(n). The content customization apparatus 12 then sends the front-end interface 28 to the one of the client devices 16(1)-16(n) in response to the request.

In step 302, the content customization apparatus 12 receives an address for a web page from the front-end interface 28 and obtains the web page based on the address. The web page can be a source web page containing content that will be included in the custom widget, and can be obtained from one of the server devices 14(1)-14(n), for example.

Figure 4:
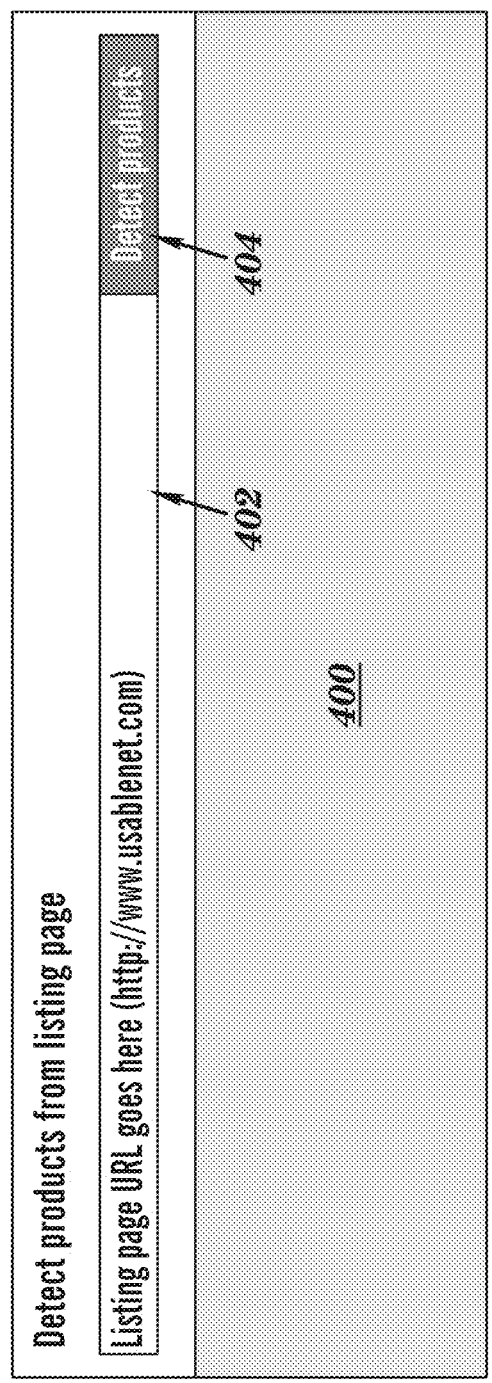
FIG. 4 is an exemplary address input page of a front-end interface.

Referring more specifically to FIG. 4, an exemplary address input page 400 of the front-end interface 28 is illustrated. In this example, the address input page 400 includes an input field 402 with a submission button 404 that is configured to initiate a request to generate a custom widget that is sent to the back-end module 30. The request to generate a custom widget includes the address of the source web page entered into the input field 402. The button 404 can be configured to generate a web service request in examples in which the back-end module 30 is a web service, although other types of requests and modules can be used in other examples.

Referring back to FIG. 3, in step 304, the content customization apparatus 12 analyzes source code of the obtained source web page to identify wrappers for items, group(s) of item(s), and/or hook(s) corresponding to information in the wrappers. In this example, the wrappers correspond to elements (e.g., HTML elements) that include information for a particular item. In one example, the source web page is a product listing page (PLP) and the items are products, although other types of items and web pages can also be used. In this example, the wrappers include at least one image or other content (e.g., a product title, description, or price) linked to another web page of a same web site as the source web page. In other examples, wrappers can be identified based on two or more types of contents within or wrapped by a same element that link to web pages associated with the same web site as the source web page, and other criteria for identifying wrappers can also be used.

Each of the group(s) in this example includes a subset of the wrappers. The back-end module 30 can identify the groups based on elements (e.g., HTML elements) corresponding to the subset of the wrappers having a same or similar parent element, for example. Accordingly, groups are identified when a wrapper is determined to be within an element including at least one other wrapper, although other methods for identifying groups of items can also be used.

Each of the hook(s) in this example points to a content element that contains part of the information associated with an item that is included in the wrapper for the item. In one example, one or more of the hooks corresponds with a CSS selector that resulted in the identification of the content element. In another example, one or more of the hooks corresponds to an HTML tag that contains a content element, such as an item image, name, description, or price, for example.

Figure 5:
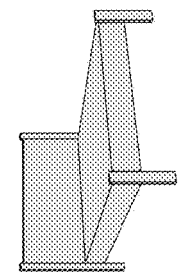
FIG. 5 is an exemplary product listing web page.

Referring more specifically to FIG. 5, a screen shot of an exemplary product listing page (PLP) 500 is illustrated. In this example, the back-end module 30 parses the source code for the PLP page 500 and identifies content elements 502 within a same HTML element that have associated links that point to web pages associated with the same web site as the PLP page 500. The content elements 502 in this example include a product image and a product description. Since the content elements 502 meet the established criteria, the back-end module 30 considers the content elements to be part of a wrapper 504 for a particular product.

Additionally, the back-end module 30 parsing the source code of the PLP page 500 can determine that a plurality of wrappers for products, including wrapper 504, have a same parent HTML element and are therefore part of a group 506 of products. Items associated with wrappers that belong to the same group may have common characteristic(s). In the example illustrated in FIG. 5 each of the items are beds, although other types of items and groups can be identified in other examples.

Referring back to FIG. 3, in step 306, the content customization apparatus 12 sends the wrappers, along with any group(s) and/or hook(s) identified in step 304, to the front-end interface 28 executed at the one of the client devices 16(1)-16(n) in response to the request to generate the custom widget received in step 300. Optionally, the wrappers, group(s), and/or hook(s) can be sent by the back-end module 30 as a JavaScript object notation (JSON) response, although other types of responses can be used. Accordingly, the JSON response in this example includes a list of items, grouped by their wrappers having associated item information, as identified based on CSS selector hooks.

In step 308, the content customization apparatus 12 receives a custom widget from the font-end interface 28 and stores the custom widget in the custom widgets store 32, which can be a database or any other type of data storage structure. The front-end interface 28 facilitates generation of the custom widget based on the information sent by the back-end module 30 in step 306, and user input, as will now be described and illustrated in more detail with reference to FIG. 6.

Figure 6:
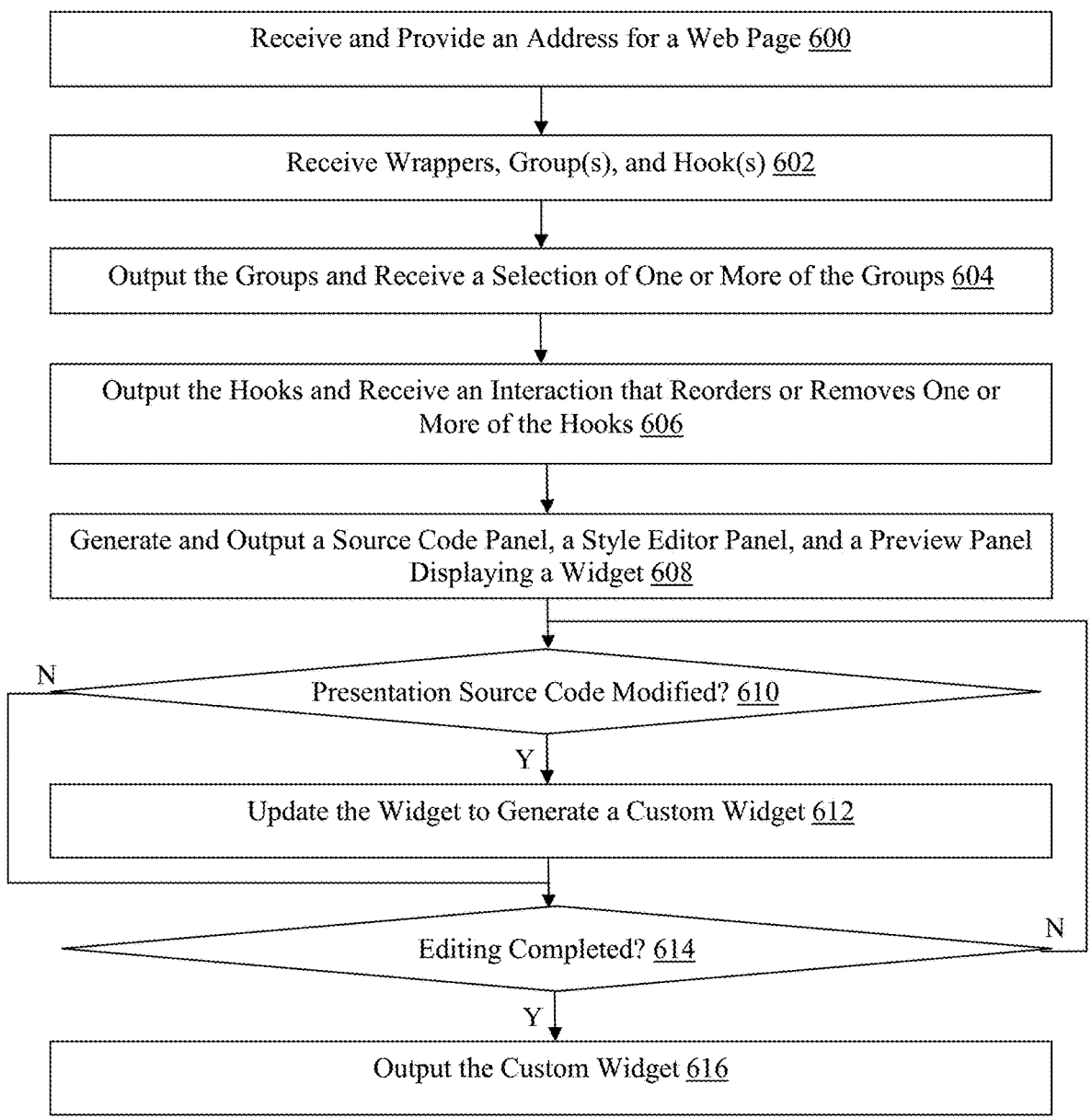
FIG. 6 is a flow chart of an exemplary method for adapting information and facilitating generation of a custom widget by a front-end interface.

In FIG. 6, a flow chart of an exemplary method for adapting information and facilitating generation of a custom widget by the front-end interface 28 is illustrated. In step 600 in this example, the front-end interface 28 receives and provides an address for a web page, which can be a source web page for content that will be included in a custom widget.

The front-end interface could be executed in a web browser by one of the client devices 16(1)-16(n), and could have been provided by the content customization apparatus 12 as described and illustrated earlier with reference to step 300 of FIG. 3, for example. Additionally, the address for the source web page could have been received via the input field 402 of FIG. 4 and provided via a web service request to the back-end module 30 following a user interaction with the button 404 of FIG. 4, for example, although other methods for receiving and/or providing the address for the source web page can be used in other examples.

In step 602, the front-end interface 28 receives at least wrappers for items, and optionally group(s) and/or hook(s). The wrappers, group(s), and/or hook(s) could have been sent from the back-end module 30 in this example, as described and illustrated in more detail earlier with reference to step 306 of FIG. 3, although other methods of receiving the wrappers, group(s), and/or hook(s) can also be used. Accordingly, the wrappers, group(s), and/or hook(s) can be included with a web service or JSON response, although the wrappers, group(s), and/or hook(s) can be received in other manners or formats in other examples.

In step 604, the front-end interface 28 outputs the groups, if any were received as identified by the back-end module 30, and receives a selection of one or more of the groups. The response received in step 602 can include an indication or identifier for each of the groups as linked to the associated wrappers, and can be in the form of source code that can be rendered by the front-end interface 28.

Figure 7:
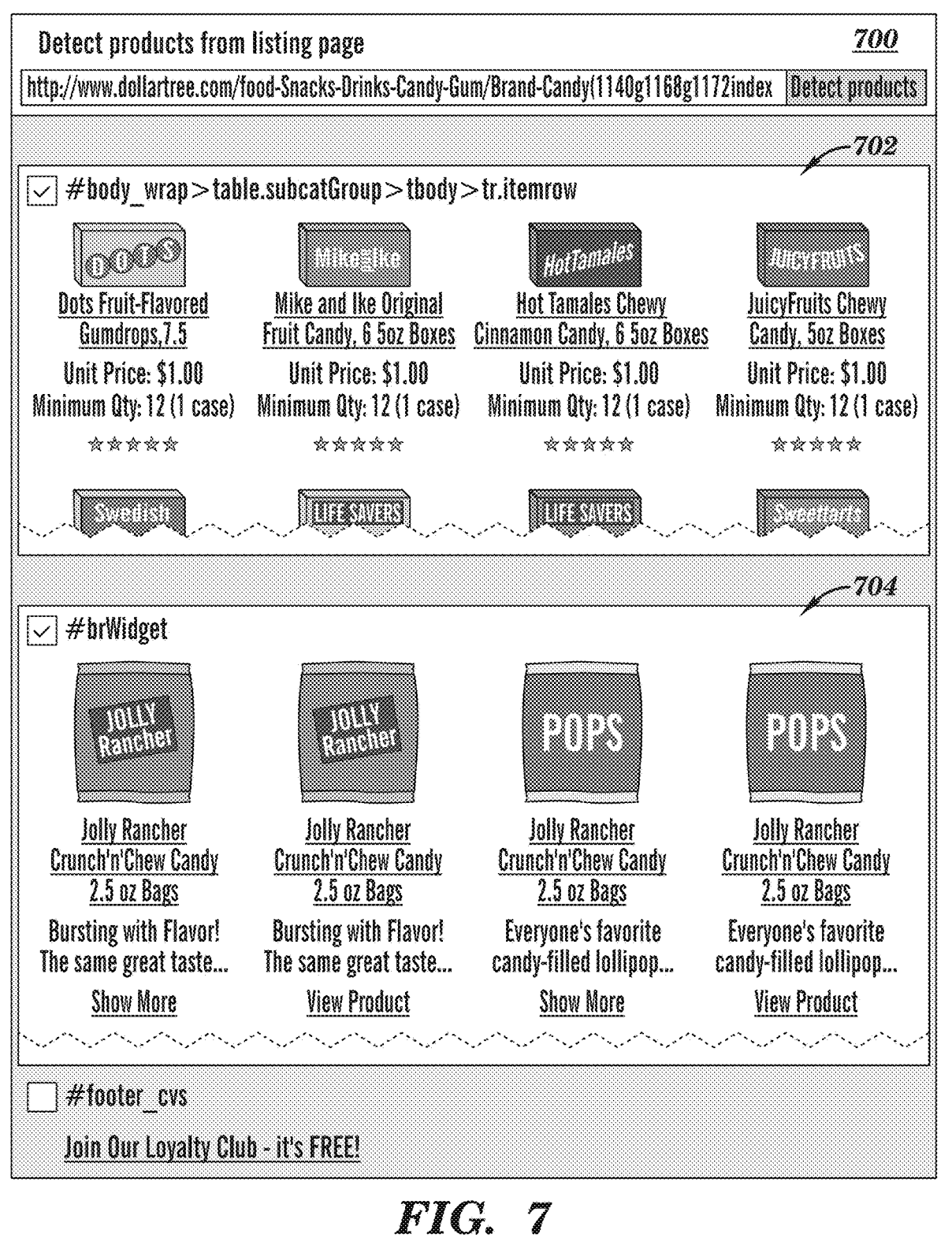

Referring more specifically to FIG. 7, an exemplary group listing page 700 of the front-end interface 28 is illustrated. In this example, the back-end interface 30 identified two groups 702 and 704 based on an analysis of the source code of a source web page. In this example, a user can interact with a checkbox to select particular groups for inclusion in the custom widget, although other methods of receiving selections of groups of items can also be used.

Figure 8:
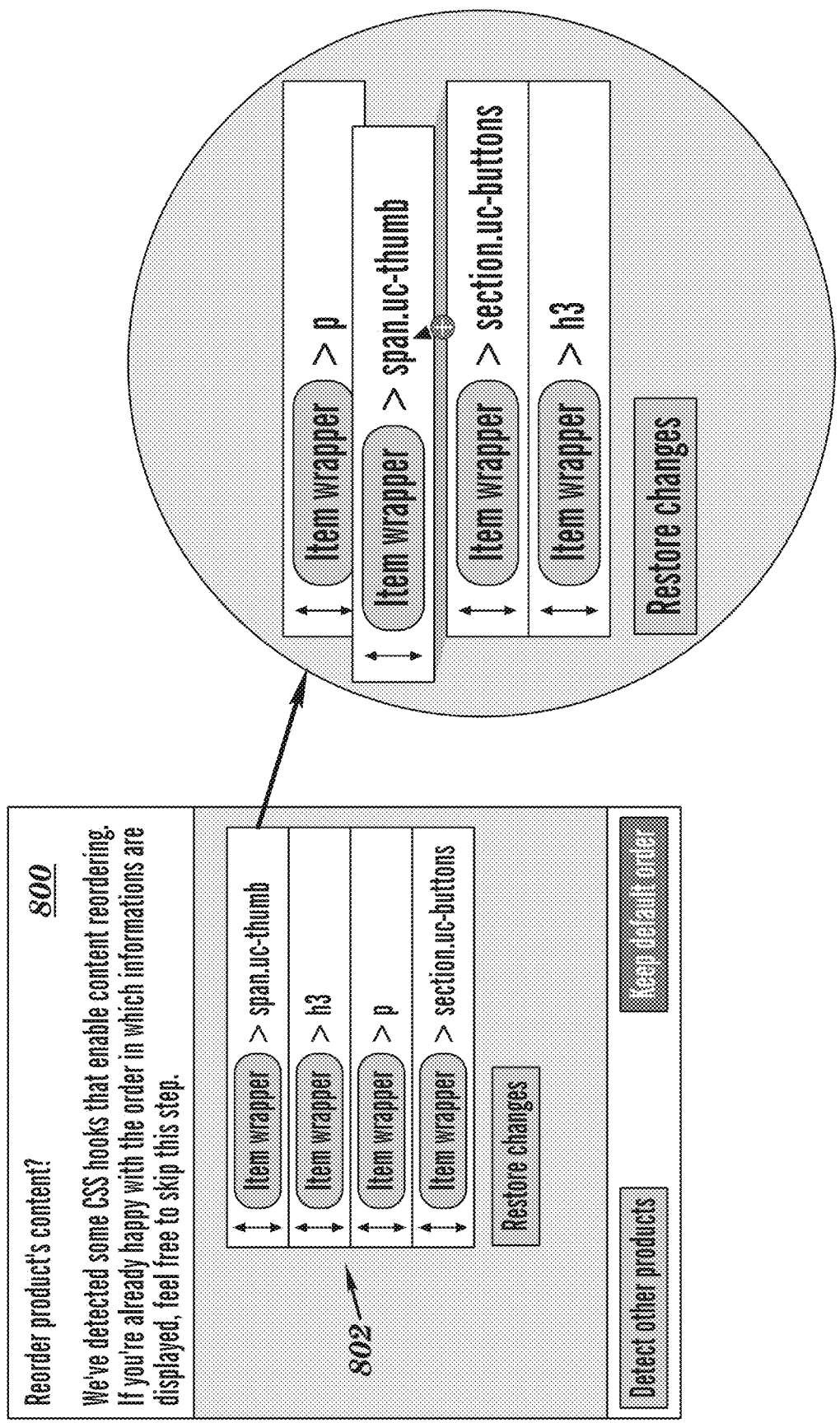
FIG. 8 is an exemplary hook reorder page of a front-end interface.

Referring back to FIG. 6, in step 606, the front-end interface 28 outputs the hook(s), if any were received as identified by the back-end module 30, and receives an interaction that reorders or removes one or more of the hooks. Referring more specifically to FIG. 8, an exemplary hook reorder page 800 of the front-end interface 28 is illustrated. In this example, the hooks are CSS selectors 802 that resulted in the identification of particular portions of the information included in the wrappers for each item. In the exemplary hook reorder page 800 of the front-end interface 28, a user can drag and drop the CSS selectors in order to effectively reorder the information associated with the CSS selectors for each of the wrappers that is subsequently displayed on the widget to be customized. Other methods for rearranging the information elements of the wrappers can also be used in other examples.

Figure 9:
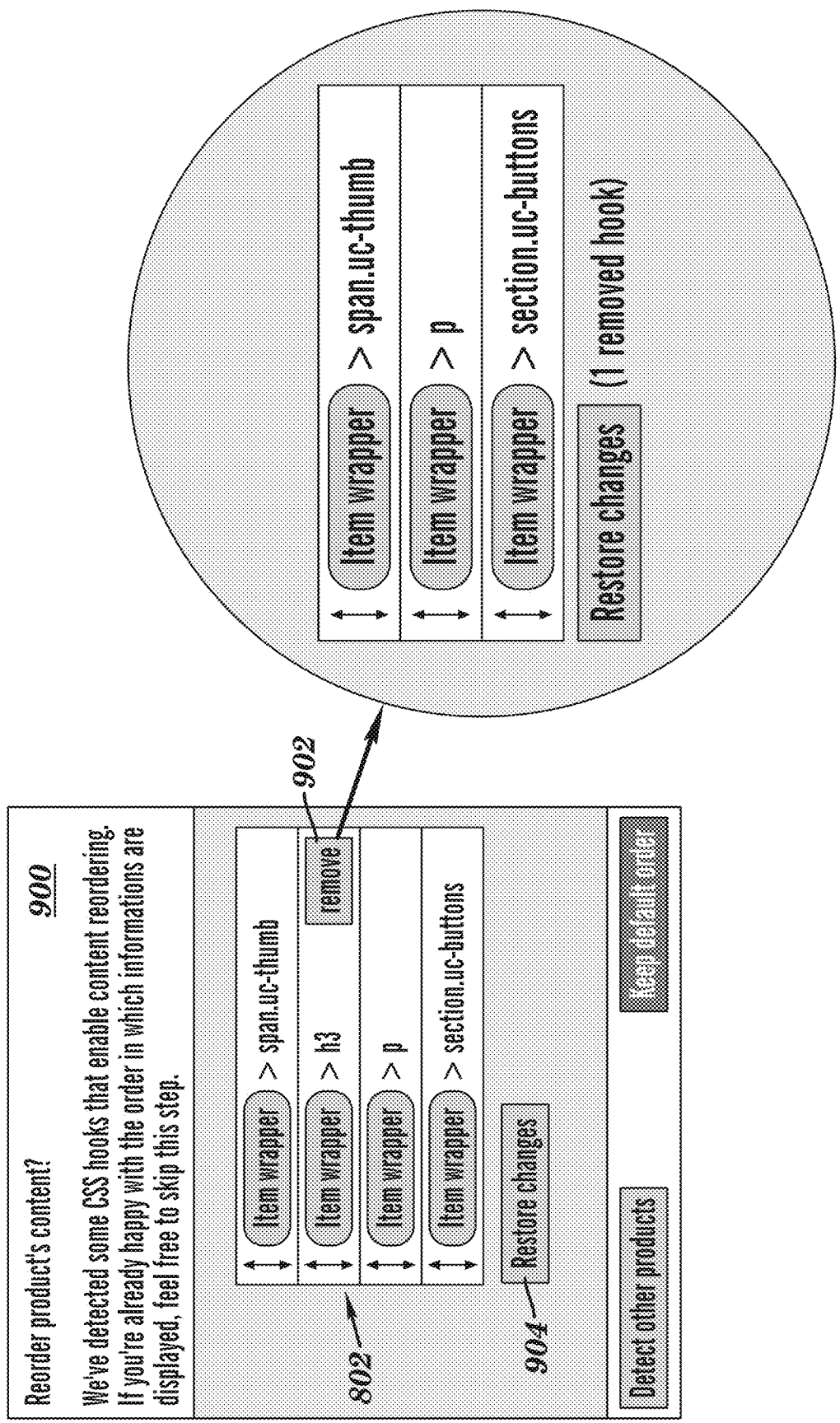
FIG. 9 is an exemplary hook removal page of a front-end interface.

Referring more specifically to FIG. 9, an exemplary hook removal page 900 of the front-end interface 28 is illustrated. In this example, a user can select a removal button 902 associated with one or more of the CSS selectors 802 in order to effectively restrict the information associated with the CSS selectors for each of the wrappers from being subsequently displayed on the widget to be customized. In this example, the hook removal page 900 includes a restore changes button 904 that can be used to return the list of CSS selectors 802 to its initial form. Other methods for removing information elements of the wrappers can also be used in other examples.

Referring back to FIG. 6, in step 608, the front-end interface 28 generates and outputs a customization page including an optional source code panel, a style editor panel, and a preview panel displaying a base widget to be customized. The source code panel, style editor panel, and preview panel can be displayed in response to a button or link selection received from a user indicating that the removal of the hook(s) has been completed, for example. The source code panel in this example includes the widget source code (e.g., HTML) for the widget to be customized. The widget source code can be generated based on the wrappers received in step 602 and the user interactions with respect to the group(s) and hook(s) in steps 604 and 606, respectively.

In this example, the style editor panel includes presentation source code (e.g., CSS) for the widget to be customized. The presentation source code is in an editable format and the front-end interface 28 is configured to automatically update the widget displayed in the preview panel in response to edits to the presentation source code in the style editor panel. Accordingly, a user with basic HTML/CSS skills can generate custom widgets that include subsets of information regarding items or products by modifying the presentation source code and viewing the result of the modification simultaneously on a same customization page of the front-end interface 28.

Referring more specifically to FIG. 10, an exemplary customization page 1000 of the front-end interface 28 with an optional source code panel 1002, a style editor panel 1004, and a preview panel 1006 is illustrated. In this example, a user of the one of the client devices 16(1)-16(n) selected two groups 1008 and 1010 of items in step 604. Accordingly, the wrappers of the associated items are displayed in the preview panel 1006 with a default style having associated default presentation source code (e.g., CSS) displayed in the style editor panel 1004. Accordingly, the preview panel 1006 of the customization page 1000 of the front-end interface 28 is configured to interpret the contents of the source code panel 1002 and style editor panel 1004 to display a widget in the preview panel 1006.

Referring back to FIG. 6, in step 610, the front-end interface 28 determines whether the presentation source code has been modified in the style editor panel 1004. If the front-end interface 28 determines that the presentation source code has been modified in the style editor panel 1004, then the Yes branch is taken to step 612.

In step 612, the front-end interface 28 updates the widget displayed in the preview panel 1006 to generate a custom widget. Accordingly, the front-end interface 28 interprets the contents of the source code panel 1002 and the style editor panel 1004, in response to a modification of the presentation source code, in order to render an updated widget in the preview panel 1006. Optionally, the front-end interface 28 can also be configured to determine whether the web page source code in the source code panel 1002 has been modified, and to update the widget in the preview panel 1006 in response to any such modification.

Figure 11:
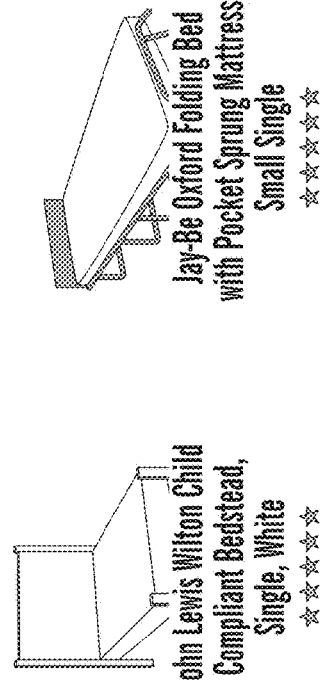
FIG. 11 is the exemplary customization page of FIG. 10 subsequent to modification of presentation source code via the style editor panel.

Referring more specifically to FIG. 11, the exemplary customization page 1000 of FIG. 10 subsequent to modification of presentation source code via the style editor panel 1004 is illustrated. In this example, the presentation source code in the style edit panel 1004 was modified to change the background of the widget in the preview panel 1006 and to display portions of the wrapper for each item as an overlay on top of the images for the item that are also included in the wrappers. Other types of modifications can also be implemented in other examples.

Referring back to FIG. 6, subsequent to updating the widget to generate the custom widget in step 612, or if the front-end interface 28 determines in step 610 that the presentation source code has not been modified and the No branch is taken, then the front-end interface 28 proceeds to step 614. In step 614, the front-end interface 28 determines whether editing of the widget has been completed. Optionally, a user of the one of the client devices 16(1)-16(n) can indicate that editing of the widget is complete by interacting with a button or other link on the customization page 100, for example, although other methods for determining when editing of the widget has been completed can also be used.

If the front-end interface 28 determines that editing of the widget has not been completed, then the No branch is taken back to step 610. Accordingly, the front-end interface 28 effectively waits for a modification to the presentation source code to be received or editing of the widget to be completed. However, if the front-end interface 28 determines in step 614 that editing of the widget has been completed, then the Yes branch is taken to step 616.

In step 616, the front-end interface 28 outputs the custom widget, optionally by sending the custom widget to the back-end module 30 for storage or publication. The custom widget sent to the back-end module 30 in this example can include the web page source code extracted from the source code panel 1002 along with the presentation source code extracted from the style edit panel 1004.

The front-end interface 28 can be configured to merge the source code such that the presentation source code is included inline in the web page source code for the widget. Alternatively, the front-end interface 28 can be configured to reference the presentation source code within the web page source code for the widget, and other methods of organizing the source code for the custom widget can also be used.

Figure 12:
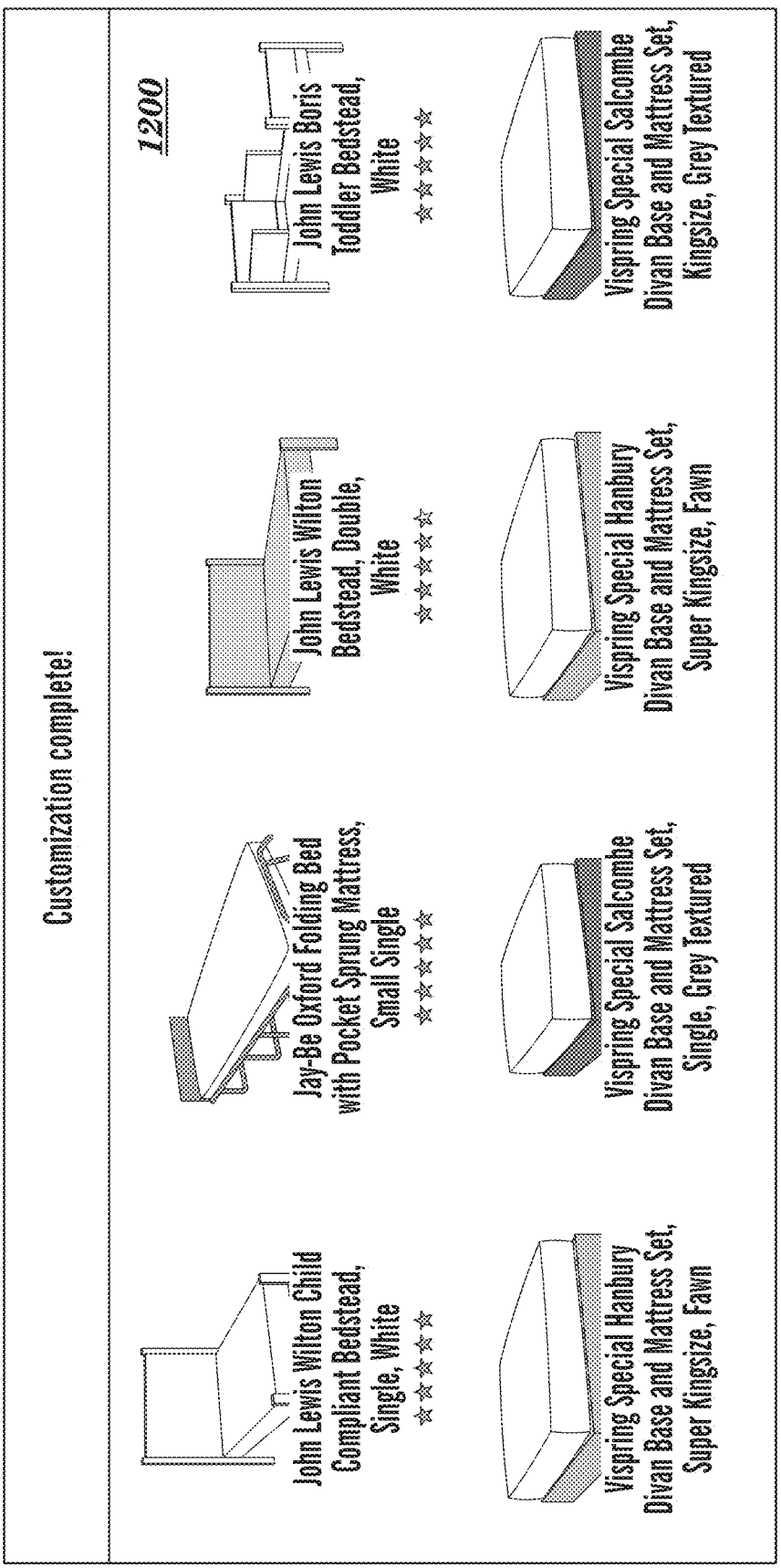
FIG. 12 is a screen shot of an exemplary custom widget.

Referring more specifically to FIG. 12, an exemplary custom widget 1200 is illustrated. The custom widget 1200 corresponds to the final version of the widget displayed in the preview panel 1006 immediately prior to completion of editing by the user of the one of the client devices 16(1)-16(n). The custom widget 1200 can be published on its own or via incorporation into another web page of the same or a different web site as the source web page.

As described and illustrated herein, this technology advantageously facilitates generation of custom widgets that include a subset of information for a subset of items or products associated with a source web page in a different style or presentation than that of the source web page. Accordingly, custom widgets can be generated using reduced resources in order to facilitate publication in various contexts. Thereby, web site developers can more easily and meaningfully engage users and consumers across different platforms and contexts with this technology.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for facilitating generation of custom widgets, the method implemented by a content customization apparatus and comprising:
   receiving a web page address from a client device via a front-end interface, wherein the front-end interface is provided to the client device in response to a request received from the client device to generate a custom widget;
   automatically analyzing web page source code for a web page obtained based on the received web page address to extract a plurality of wrappers defined in the web page source code, wherein each of the wrappers comprises information for at least one of a plurality of items;
   providing the wrappers to the front-end interface at the client device; and
   receiving the custom widget from the front-end interface at the client device, wherein the front-end interface is configured to:
      generate and output a style editor panel comprising presentation source code in an editable format and a preview panel comprising an initial widget comprising the wrappers; and
      automatically update the initial widget in the preview panel, in response to modification of the presentation source code via the style editor panel, to generate the custom widget.

2. The method of claim 1, wherein the wrappers each comprise at least one image or other content linked to another web page of a same web site as the web page.

3. The method of claim 1, further comprising:
   analyzing the web page source code for the web page to identify a plurality of groups each comprising a subset of the wrappers; and
   providing the groups in response to the submission of the address, wherein the front-end interface is further configured to output the groups, receive a selection of one or more of the groups, and generate and output at least the preview panel based on the selected one or more of the groups.

4. The method of claim 1, wherein the front-end interface is further configured to generate and output a source code panel comprising a portion of the web page source code corresponding to the initial widget, the web page source code comprises hypertext markup language (HTML) and the presentation source code comprises cascading style sheet (CSS) language.

5. The method of claim 1, further comprising:
   analyzing the web page source code for the web page to identify a plurality of hooks, wherein portions of the information in the wrappers each correspond to one of the hooks; and
   providing the hooks in response to the submission of the address, wherein the front-end interface is further configured to output the hooks, receive an interaction, comprising a reordering or removal of one or more of the hooks, and output at least the preview panel based on the received interaction.

6. The method of claim 1, wherein the web page is a product listing page (PLP), the items comprise products for sale, and the information in one or more of the wrappers comprises one or more of a product name, a product price, or a product image.

7. A content customization apparatus, comprising memory comprising programmed instructions stored thereon and one or more processors configured to be capable of executing the stored programmed instructions to:
   receive a web page address from a client device via a front-end interface, wherein the front-end interface is provided to the client device in response to a request received from the client device to generate a custom widget;
   automatically analyze web page source code for a web page obtained based on the received web page address to extract a plurality of wrappers defined in the web page source code, wherein each of the wrappers comprises information for at least one of a plurality of items;
   provide the wrappers to the front-end interface at the client device; and
   receive the custom widget from the front-end interface at the client device, wherein the front-end interface is configured to:
      generate and output a style editor panel comprising presentation source code in an editable format and a preview panel comprising an initial widget comprising the wrappers; and
      automatically update the initial widget in the preview panel, in response to modification of the presentation source code via the style editor panel, to generate the custom widget.

8. The content customization apparatus of claim 7, wherein the wrappers each comprise at least one image or other content linked to another web page of a same web site as the web page.

9. The content customization apparatus of claim 7, wherein the one or more processors are further configured to be capable of executing the stored programmed instructions to:

analyze the web page source code for the web page to identify a plurality of groups each comprising a subset of the wrappers; and provide the groups in response to the submission of the address, wherein the front-end interface is further configured to output the groups, receive a selection of one or more of the groups, and generate and output at least the preview panel based on the selected one or more of the groups.

10. The content customization apparatus of claim 7, wherein the front-end interface is further configured to generate and output a source code panel comprising a portion of the web page source code corresponding to the initial widget, the web page source code comprises hypertext markup language (HTML) and the presentation source code comprises cascading style sheet (CSS) language.

11. The content customization apparatus of claim 7, wherein the one or more processors are further configured to be capable of executing the stored programmed instructions to:

analyze the web page source code for the web page to identify a plurality of hooks, wherein portions of the information in the wrappers each correspond to one of the hooks; and provide the hooks in response to the submission of the address, wherein the front-end interface is further configured to output the hooks, receive an interaction, comprising a reordering or removal of one or more of the hooks, and output at least the preview panel based on the received interaction.

12. The content customization apparatus of claim 7, wherein the web page is a product listing page (PLP), the items comprise products for sale, and the information in one or more of the wrappers comprises one or more of a product name, a product price, or a product image.

13. A non-transitory computer readable medium having stored thereon instructions for facilitating generation of custom widgets comprising executable code which when executed by one or more processors, causes the one or more processors to:

receive a web page address from a client device via a front-end interface, wherein the front-end interface is provided to the client device in response to a request received from the client device to generate a custom widget;

automatically analyze web page source code for a web page obtained based on the received web page address to extract a plurality of wrappers defined in the web page source code, wherein each of the wrappers comprises information for at least one of a plurality of items;

provide the wrappers to the front-end interface at the client device; and receive the custom widget from the front-end interface at the client device, wherein the front-end interface is configured to:

generate and output a style editor panel comprising presentation source code in an editable format and a preview panel comprising an initial widget comprising the wrappers; and automatically update the initial widget in the preview panel, in response to modification of the presentation source code via the style editor panel, to generate the custom widget.

14. The non-transitory computer readable medium of claim 13, wherein the wrappers each comprise at least one image or other content linked to another web page of a same web site as the web page.

15. The non-transitory computer readable medium of claim 13, wherein the executable code when executed by the one or more processors further causes the one or more processors to:

analyze the web page source code for the web page to identify a plurality of groups each comprising a subset of the wrappers; and provide the groups in response to the submission of the address, wherein the front-end interface is further configured to output the groups, receive a selection of one or more of the groups, and generate and output at least the preview panel based on the selected one or more of the groups.

16. The non-transitory computer readable medium of claim 13, wherein the front-end interface is further configured to generate and output a source code panel comprising a portion of the web page source code corresponding to the initial widget, the web page source code comprises hypertext markup language (HTML) and the presentation source code comprises cascading style sheet (CSS) language.

17. The non-transitory computer readable medium of claim 13, wherein the executable code when executed by the one or more processors further causes the one or more processors to:

analyze the web page source code for the web page to identify a plurality of hooks, wherein portions of the information in the wrappers each correspond to one of the hooks; and provide the hooks in response to the submission of the address, wherein the front-end interface is further configured to output the hooks, receive an interaction, comprising a reordering or removal of one or more of the hooks, and output at least the preview panel based on the received interaction.

18. The non-transitory computer readable medium of claim 13, wherein the web page is a product listing page (PLP), the items comprise products for sale, and the information in one or more of the wrappers comprises one or more of a product name, a product price, or a product image.

\* \* \* \* \*